United States Patent [19]

Jester et al.

[11] Patent Number: 4,519,731
[45] Date of Patent: May 28, 1985

[54] MILLING CUTTER

[75] Inventors: Willi Jester, Herten-Westerholt; Heinrich Krüger, Essen, both of Fed. Rep. of Germany

[73] Assignee: Fried. Krupp Gesellschaft m.b.H., Essen, Fed. Rep. of Germany

[21] Appl. No.: 476,341

[22] Filed: Mar. 15, 1983

[30] Foreign Application Priority Data

Mar. 26, 1982 [DE] Fed. Rep. of Germany ....... 3211136

[51] Int. Cl.³ .................. B26D 1/00; B26D 1/12; B23C 5/22
[52] U.S. Cl. .................. 407/46; 407/41; 407/48; 407/49; 407/52; 407/56
[58] Field of Search ............ 407/41, 49, 48, 103, 407/61, 62, 64, 65, 46, 58, 59, 60, 61, 62, 101, 52, 56; 408/197, 198

[56] References Cited

U.S. PATENT DOCUMENTS

| 2,407,501 | 9/1946 | Kraus | 407/48 |
|---|---|---|---|
| 2,630,725 | 3/1953 | Black | 407/48 |
| 3,578,742 | 5/1971 | Manthei | 407/41 |
| 3,643,310 | 2/1972 | Kilbourne et al. | 407/48 |
| 3,675,290 | 7/1972 | Mayer | 407/46 |
| 3,788,625 | 1/1974 | Lindsay | |
| 3,839,772 | 10/1974 | Shimomura et al. | 407/48 |
| 3,946,475 | 3/1976 | Hopkins | 407/103 |
| 4,165,947 | 8/1979 | Smids | 407/46 |
| 4,182,587 | 1/1980 | Striegl | 407/48 |
| 4,264,245 | 4/1981 | Lindsay | 407/41 |
| 4,330,227 | 5/1982 | Raye et al. | 407/46 |

FOREIGN PATENT DOCUMENTS

| 840043 | 5/1952 | Fed. Rep. of Germany . | |
| 1627088 | 4/1970 | Fed. Rep. of Germany . | |
| 2615913 | 10/1977 | Fed. Rep. of Germany . | |
| 56-147023 | 11/1981 | Japan . | |
| 57-55528 | 11/1982 | Japan . | |
| 1431374 | 4/1967 | United Kingdom | 407/40 |
| 449783 | 4/1975 | U.S.S.R. | 407/40 |

Primary Examiner—Leonidas Vlachos
Assistant Examiner—Jerry Kearns
Attorney, Agent, or Firm—Spencer & Frank

[57] ABSTRACT

A milling cutter including a supporting body having a longitudinal axis and presenting a frontal face and a circumferential side. The supporting body is provided with a radial recess. A plurality of cutting plates are disposed along the circumferential side and arranged in rows each extending generally in the longitudinal direction of the supporting body. At least one of the cutting plates is a face cutting plate having a cutting edge for cutting at both the circumferential side and at the frontal face. The cutter includes a cassette having a quadrilateral cross section and disposed in the recess. The face cutting plate is fastened to the cassette, and at least one fastening element is provided for releasably tightening the cassette in the recess.

1 Claim, 9 Drawing Figures

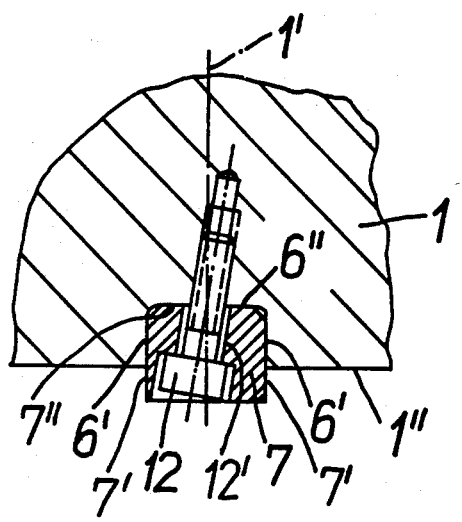
FIG. 1C
FIG. 2
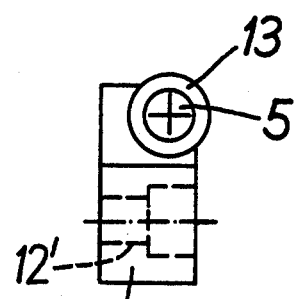
FIG. 3
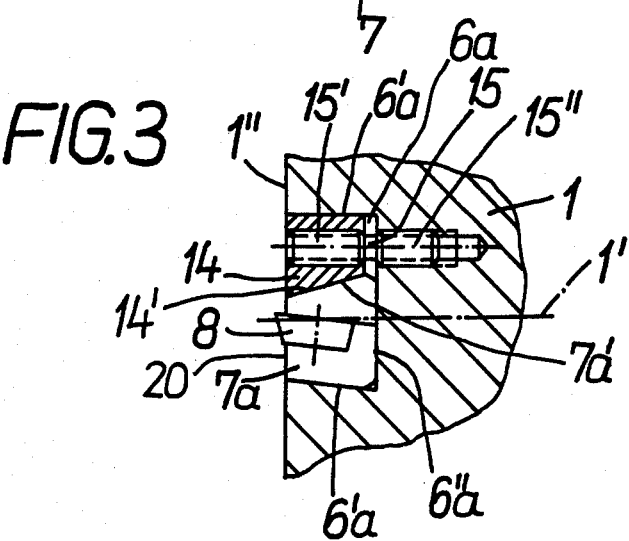

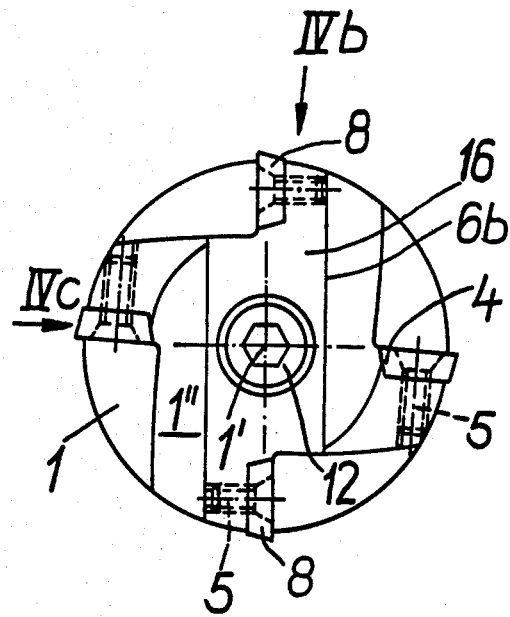
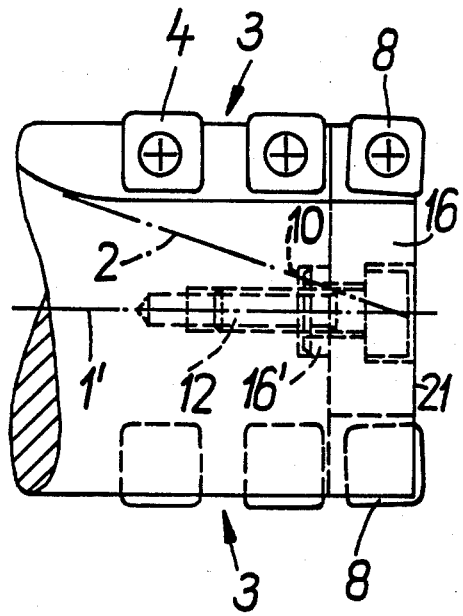
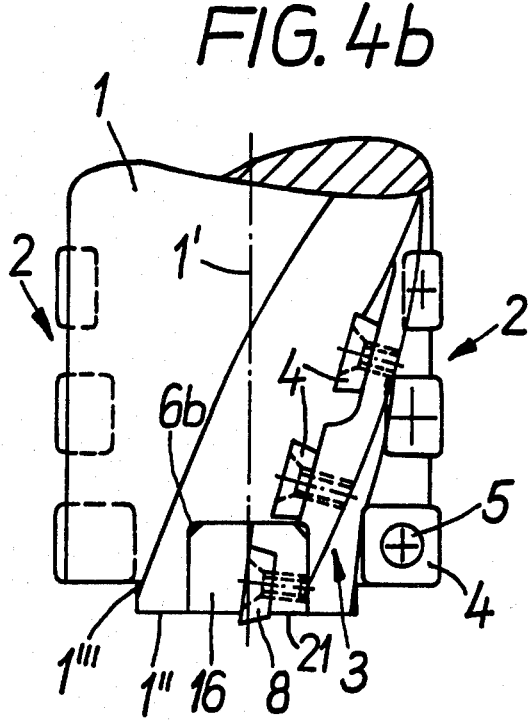
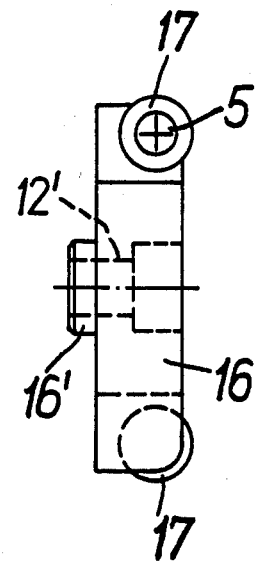

MILLING CUTTER

BACKGROUND OF THE INVENTION

The present invention relates to a milling cutter having a plurality of reversible cutting plates arranged along the circumferential side of a cylindrical supporting body in rows in the longitudinal direction of the body. At least one of the rows terminates at the frontal face of the supporting body with a reversible face cutting plate which has a cutting edge for cutting both at the frontal face and circumferential side of the supporting body. The cutter further includes at least one cassette for accommodating at least one reversible face cutting plate. The cassette is releasably held in an essentially radial recess in the supporting body and rests against an abutment face which secures the radial position of the cassette.

Milling cutters employing reversible cutting plates, and used, in particular, for rough cutting with larger cutting depths, should work with the greatest possible cutting performance with good economy and service life. For structural reasons, the longitudinal rows of reversible cutting plates disposed at the circumference of the supporting body are offset with respect to one another such that a total overlap results in the logitudinal direction of the supporting body. In such embodiments, the number of reversible face cutting plates (i.e., those plates that cut at both the frontal face and circumferential side of the supporting body) is generally less than the total number of rows of cutting plates. In most cases the total number of rows is twice the number of the reversible face cutting plates which are under particularly great stress from the cutting forces occurring during the cutting process and from thermal stresses connected therewith.

A breakage in a reversible face cutting plate often extends across the corner of the cutting edge of the cutting plate and generally brings about substantial damage to the supporting body which, under certain circumstances, prevents its further use. Therefore, numerous attempts have been made to protect as best as possible the relatively expensive supporting body of a milling cutter against damage by suitable design and arrangement of their coacting components.

Swiss Patent No. 564,998 and German Offenlegungsschrift (Patent Application published without examination) No. 2,603,735 disclose milling cutters in which reversible cutting plates are supported and held in a supporting body by cassettes. These cassettes, which each exchangeably hold one reversible cutting plate, are of essentially cylindrical design and are held in correspondingly shaped, essentially radially oriented recesses in the supporting body.

A drawback of these known embodiments is that in order to provide a sufficiently precise positioning of the reversible cutting plates in the supporting body, they require relatively complicated additional elements such as a central abutment as in the above noted Swiss patent, or a set screw which cooperates with an abutment cylinder as in the above noted German patent application.

Another disadvantage of the known prior art milling cutters is that the cylindrically shaped cassettes, due to their geometrical shape, only provide sufficient support for the associated reversible face cutting plate in its greatly endangered corner region if the supporting body projects as far as possible in the direction toward the reversible face cutting plate. The result is that the cassettes holding the reversible face cutting plates are flush with the frontal face of the supporting body. The supporting body, because it axially lies slightly behind the frontal face cutting edge of the reversible face cutting plates, can easily be damaged.

A further drawback of the known embodiments is that, due to the arrangement and configuration of the cassettes, as well as the projecting design of the supporting body, the use of differently shaped reversible face cutting plates is not possible unless additional measures are taken.

SUMMARY OF THE INVENTION

It is an object of the present invention to provide a milling cutter which has a robust and compact design so that sufficiently high cutting output is possible and in which the supporting body is substantially protected against damage when one of the reversible cutting plates breaks. The present invention is intended, in particular, for use with milling cutters having a cutting diameter of less than 100 mm.

It is a futher object of the invention to provide a milling cutter in which the frontal face of the supporting body can be selectively equipped with differently configured reversible cutting plates so that the cutter can be adapted, without special retrofitting work or additional measures, to different operating conditions, for example, corner or copy cutting work.

The above and other objects are accomplished according to the invention in which each cassette extending into a radial recess in the supporting body has a quadrilateral cross section and is, by means of at least one fastening element, tightened at least also in the direction of the supporting body. The at least one fastening element thus results in a force applied in a direction toward the cassette, preferably placing the cassette against at least one of the three walls which form the recess, i.e., the two side walls and the bottom wall of the recess.

In one preferred embodiment of the present invention, the fastening element tightening the cassette to at least one of the recess faces is arranged parallel or at an acute angle to the longitudinal axis of the supporting body. However, those embodiments in which the fastening element engages laterally in the supporting body outside the region of the frontal face also fall within the scope of the present invention.

In another preferred embodiment of the present invention each recess is open toward the frontal face of the supporting body. That is, each recess is designed as a groove having two side walls and a bottom wall. The cassette accommodated in the recess may therefore axially project from the recess, if required, without impeding the support of the associated reversible face cutting plate.

In another advantageous embodiment of the invention, the recesses and associated cassettes are matched to one another in design so that each cassette can be inserted into its associated recess from the frontal face of the supporting body. Such embodiments are provided, in particular, with groove shaped recesses in which the width of the recess, viewed from the direction of the frontal face toward the supporting body, is either constant or decreases. Advisably, the fastening elements for the cassettes are arranged and designed such that they engage the supporting body from its frontal face.

The use of a recess and cassette each having a rectangular cross section has the result that the cassette, embedded at least in part in the associated recess, is secured against rotation without any special measures and, as a result of the occasionally open configuration of the recess toward the frontal face of the supporting body, can be installed and removed without difficulty. To support the reversible face cutting plate substantially uniformly over its entire area, the recess wall facing the chip face of the cutting plate and supporting the cassette is oriented approximately parallel to the chip face.

Another embodiment of the invention is distinguished in that only one reversible face cutting plate is fastened in each cassette. Such individual cassettes have the advantage that they can easily be associated with milling cutters employing different cutting diameters. However, it is also possible to equip a cassette with a plurality of reversible face cutting plates which lie on the same circle path diameter with respect to the longitudinal axis of the supporting body, the cassette being centered with respect to the supporting body.

The abutment face which secures the radial alignment of the cassette may simply comprise a centrally disposed pin of the supporting body or a centrally inserted sleeve which radially supports each cassette.

In another embodiment of the invention, the abutment face is part of the wall of a centering bore disposed in the center of the supporting body into which the associated cassette engages from the frontal face of the supporting body. Such a centering bore may serve, in particular, to secure the position of a cassette which is equipped with a plurality of reversible face cutting plates. Such a multiple-plate cassette engages the centering bore of the supporting body via a central pin.

In another preferred embodiment of the present invention, the abutment face is part of a centering body which is releasably connected with the supporting body. The centering body may comprise, in particular, an exchangeable pin against which individual cassettes rest from the outside.

A multiple-plate cassette, that is, a cassette holding more than one reversible face cutting plate, may be designed as a bar which is equipped at each of oppositely disposed ends with respect to the longitudinal axis of the supporting body with at least one reversible face cutting plate. Such cassettes may also be given a cross or star-shaped design and may be equipped, in particular, with at least four reversible face cutting plates. The fastening means for a multiple cassette may simply comprise at least one clamping screw which penetrates through the cassette and into the supporting body.

Cassettes equipped with centering means, which includes multiple cassettes in particular, advantageously have only one clamping screw, the axis of which coincides with the longitudinal axis of the supporting body. Individual cassettes which are equipped with only one reversible face cutting plate expediently have only one clamping screw which is arranged at an oblique angle with respect to the longitudinal axis of the supporting body. The clamping screw, which is arranged eccentrically may be inclined relative to the direction of the longitudinal axis and/or it may have an inclination in the radial direction of the supporting body.

In another embodiment, each cassette is held in the recess by means of a clamping body, particularly a clamping wedge which is coupled with the supporting body via at least one fastening element. Thus, the recess accommodates not only the cassette but also the clamping body which rests against the cassette as well as the wall of the recess. To protect the clamping body, each cassette projects axially beyond it.

In still a further preferred embodiment of the present invention, the frontal cutting plates of those rows which contain only circumference cutting plates, terminate approximately at the frontal face of the supporting body, while each cassette projects axially beyond each such frontal reversible circumference cutting plate by about one half of the length of the cutting edge thereof. Due to the projection of the cassette beyond the frontal reversible circumference cutting plate there results substantially larger chip clearances which permit the use of higher feed rates of the cutter without the danger of chip backup.

BRIEF DESCRIPTION OF THE DRAWINGS

FIG. 1c is a fragmentary sectional view along line Ic—Ic of FIG. 1a.

FIG. 2 is a side elevational view of a component shown in FIG. 1b, supporting a circular face cutting plate.

FIG. 3 is a fragmentary sectional elevational view of another preferred embodiment.

FIG. 4a is an end elevational view of a further preferred embodiment according to the invention.

FIGS. 4b and 4c are axial views of the embodiment shown in FIG. 4a viewed in the direction of arrow IVb and IVc, respectively.

FIG. 5 is a side elevational view of a component shown in FIGS. 4a–4c, supporting a circular reversible face cutting plate.

DESCRIPTION OF THE PREFERRED EMBODIMENTS

Figure 1A:
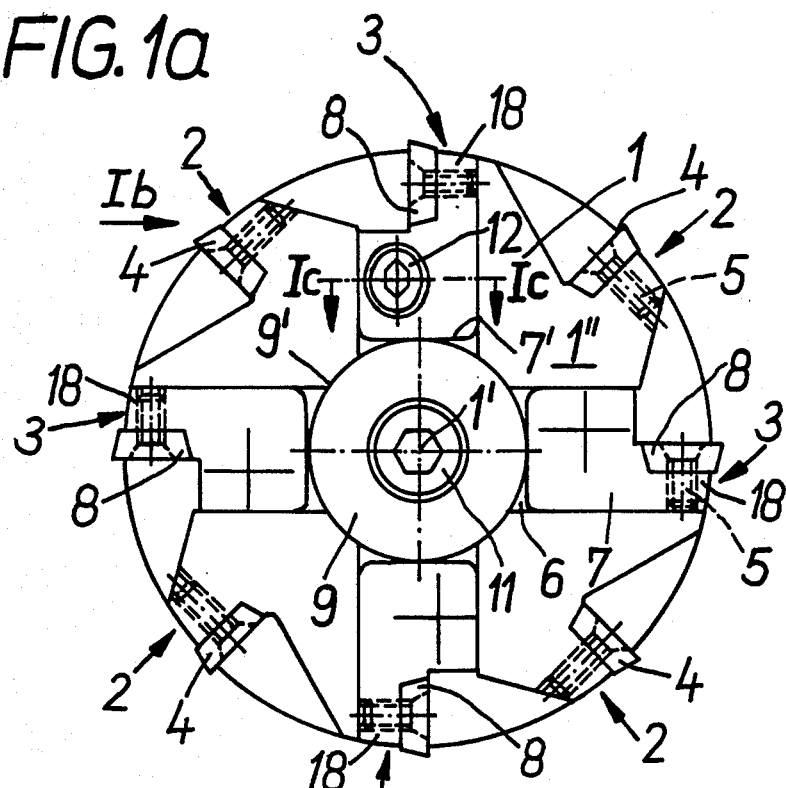
FIG. 1a is an end elevational view of a preferred embodiment of the invention.
Figure 1B:
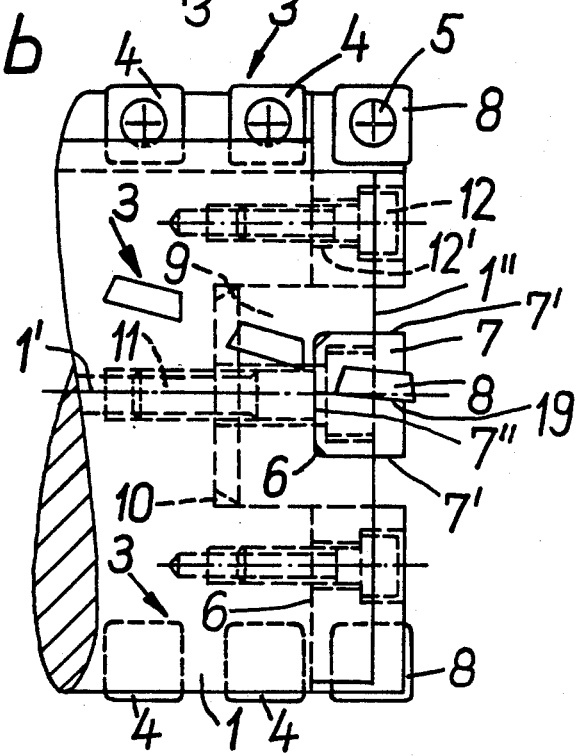
FIG. 1b is a side elevational view of the embodiment of FIG. 1a, viewed in the direction of arrow Ib, with some components omitted for clarity.

A preferred embodiment of a milling cutter according to the invention is shown in simplified illustration in FIGS. 1a–1c. As shown in FIGS. 1a and 1b, the milling cutter includes a supporting body 1 with longitudinal axis 1' and frontal face 1". Supporting body 1 has a plurality of reversible cutting plates 4 which are each mounted on supporting body 1 by a securing bolt 5 and which are disposed on the circumference of supporting body 1 in a staggered manner in eight rows 2 and 3 disposed generally in the longitudinal direction—that is, in the direction of the longitudinal axis 1'—of the supporting body 1. Each row 2 is composed solely of reversible circumference cutting plates 4. Each row 3 includes reversible circumference cutting plates 4 and in addition is terminated at frontal face 1" with a reversible face cutting plate 8 having a chip face 19. Reversible cutting plate 8 axially extends beyond frontal face 1" and cuts both at the circumference and at frontal face 1" of supporting body 1. Rows 2 which are diametrically opposite to one another with respect to longitudinal axis 1' have diametrically aligned cutting plates 4. Similarly, rows 3 which are diametrically opposite to one another have diametrically aligned cutting plates 4 and 8.

The cutting plates of any two immediately adjacent rows 2 and 3 are mutually staggered such that, for example, the gaps between the reversible cutting plates of row 3 are covered by the cutting plates of row 2. Thus, a continuous cut is possible over the entire length of rows 2 and 3.

Advisably, rows 2 and 3 are each disposed helically along the circumference of supporting body 1 so as to assure quiet running of the milling cutter.

In the region of its frontal face 1" supporting body 1 is equipped with four groove-shaped recesses 6 which, as shown in FIG. 1b, are disposed in front of the frontal reversible circumference cutting plate 4 in each row 3 closest to frontal face 1". Recesses 6 are spaced from one another by 90° with respect to longitudinal axis 1' and their cross section parallel to longitudinal axis 1' is rectangular. Each recess 6 accommodates a cassette 7 which likewise has a rectangular cross section. Each cassette 7 has a narrowed outer portion 18 which is oriented toward the circumference of supporting body 1 and which carries a reversible face cutting plate 8 releasably fastened thereto by a clamping screw 5.

Thus, while the three cutting plate rows 3 shown in FIG. 1b each have a reversible face cutting plate 8 and two reversible circumference cutting plates 4 disposed on supporting body 1, the cutting plate rows 2 (not shown in FIG. 1b), arranged offset with respect to the cutting plate rows 3, are equipped solely with reversible circumference cutting plates 4 which axially overlap the reversible cutting plates of the respectively adjacent cutting plate rows 3.

The position of each cassette 7 with respect to supporting body 1 is fixed in the radial direction of the supporting body 1 by a centering body, such as a pin 9, which is supported in a centering bore 10 centrally located in supporting body 1. Pin 9 is releasably fastened by a screw 11 which is arranged such that its axis coincides with longitudinal axis 1'. Cassettes 7 are each fastened by screwing in a respective clamping screw 12, the axis of which is inclined with respect to longitudinal axis 1' of the supporting body 1 as shown in FIG. 1c.

Of significance is the frontally open design of recesses 6, each of which is formed by only two side walls 6' and a bottom wall 6" of supporting body 1. As a result, cassettes 7 can be inserted into supporting body 1 from the direction of frontal face 1" and may be of such configuration that they axially project, as shown in FIGS. 1b and 1c, together with the associated reversible face cutting plates 8, beyond frontal face 1" of supporting body 1 as well as beyond the respectively provided frontal reversible circumference cutting plates 4 (not shown in FIG. 1b) which terminate rows 2 at the frontal face end of supporting body 1. Frontal reversible circumference cutting plates 4 of rows 2 are preferably arranged such that they terminate approximately flush with frontal face 1".

In one of the preferred embodiments of the invention, the dimensions of cassettes 7 are selected such that they, together with their associated reversible face cutting plates 8, project axially beyond frontal reversible circumference cutting plates 4 of rows 2 by approximately one-half the length of the cutting edges of the frontal reversible circumference cutting plates 4. In the region of frontal face 1" of supporting body 1 there consequently are formed sufficiently large chip clearances which permit sufficiently high feed rates of the cutter and, hence, increased cutting output of the milling cutter without the danger of chip backup.

Due to the open design of recesses 6 at frontal face 1" the milling cutter can be matched to different operating conditions without loss of time and without retrofitting. For example, a cassette 7 shown in FIG. 2, which is equipped with a circular reversible face cutting plate 13, can be substituted for each of cassettes 7 shown in FIG. 1 which are each equipped with a square reversible face cutting plate 8.

Of course, cassettes 7 of different designs, particularly those accommodating other types of reversible face cutting plates, can also be used. However, each cassette 7 should be designed such that its side wall facing the chip face of reversible face cutting plate 8, i.e., in FIG. 1b, the upper side wall 7' should extend approximately parallel to chip face 19. By virtue of the engagement of lower side wall 7' with the corresponding recess wall 6', reversible face cutting plate 8 is supported substantially uniformly over its entire area.

The invention is not limited to the use of cassettes 7 which have planar side walls 7' and a planar bottom wall 7". To improve the supporting behavior, the three cassette walls 7' and 7" may also be equipped with recesses or teeth, if required.

The cross sections of cassettes 7 and recesses 6 may be rectangular or square, as shown in FIG. 1, or trapezoidal, as shown in FIG. 3.

In contrast to the above-discussed embodiments, FIG. 3 illustrates an embodiment in which the cross section of recess 6a is substantially larger than the cross section of cassette 7a accommodated therein. Cassette 7a in FIG. 3 is equipped with a single reversible face cutting plate 8 and has a frontal surface 20 that is flush with frontal face 1" of supporting body 1. In this embodiment the upper side wall 6a' of the recess 6a (as viewed in FIG. 3) is parallel to longitudinal axis 1' of supporting body 1. The lower side wall 6a' of recess 6 is inclined with respect to longitudinal axis 1" such that the width of recess 6a increases in the longitudinal direction away from frontal face 1". A clamping wedge 14, which is held in supporting body 1 by means of a pin 15 having threaded parts 15' and 15" engaging into the wedge 14 and the supporting body 1, respectively, is provided for clamping cassette 7a into recess 6a. A side face 7a' of cassette 7a rests against a corresponding wall 14' of clamping wedge 14 and has a slope which is directed opposite to that of the lower side wall 6a' relative to the axis 1'.

FIGS. 4a, 4b and 4c illustrate another embodiment of the milling cutter according to the invention wherein only one cassette 16, which is designed as a double cassette, is equipped with two reversible face cutting plates 8, and is supported in a continuous recess 6b in supporting body 1. Cutting plates 8 are disposed on cassette 16 diametrally opposite one another with respect to longitudinal axis 1' of supporting body 1. In FIG. 4c the visible cutting plate row 2 is, for clarity, only symbolically shown by a broken line. Supporting body 1 is equipped in this embodiment with a total of four alternating cutting plate rows 2 and 3 angularly spaced from one another by 90° with respect to longitudinal axis 1'. The two reversible face cutting plates 8 of cassette 16 terminate the frontal side end of the two cutting plate rows 3.

The position of cassette 16, as well as the radial position of associated reversible face cutting plates 8, is fixed by a centering ledge 16' (FIG. 4c) which engages in a centering bore 10 disposed centrally in supporting body 1. A single clamping screw 12, which is coaxial with the axis 1' is provided to fasten cassette 16 to supporting body 1.

Since cassette 16 or, more particularly, the frontal face 21 thereof terminates flush with frontal face 1" of supporting body 1, as shown in FIG. 4b, frontal face 1" is advisably arranged such that it axially protrudes beyond frontal reversible cutting plates 4 of the two cutting plate rows 2, while forming a ledge 1'''. By suitably dimensioning ledge 1''' and suitably arranging reversible face cutting plates 8 in cassette 16, it is assured in this embodiment, as well, that reversible face cutting plates 8 project to a sufficient degree beyond reversible circumference cutting plates 4 of the two cutting plate rows 2.

To adapt the cutter to different operating conditions, double cassette 16 can be replaced, upon release of clamping screw 12, by another cassette 16, for example, with two circular reversible face cutting plates 17 which are fastened on both sides by respective clamping screws 5 as shown in FIG. 5.

The embodiment of the present invention shown in FIGS. 4 and 5 may be modified, in particular, to the extent that cassette 16 may be provided with a centrally or eccentrically arranged centering opening instead of centering ledge 16'. With such a modification in cassette 16, supporting body 1 is provided with an abutment member in the form of a pin or a sleeve for engaging the centering opening in the cassette. A cassette 16 modified in this way is fastened to supporting body 1 by means of one or a plurality of clamping screws expediently arranged outside the region of the centering opening and the longitudinal axis 1'.

On the end of supporting body 1 facing away from the frontal face 1", the milling cutter can be provided in a known manner, with a clamping member (not shown) with which it can be connected to a corresponding tool receptacle. The clamping member may have the shape, for example, of a cylindrical shaft or a steep cone, which is connected with supporting body 1 either in a fixed or in a releasable manner.

The invention also includes embodiments modified from that illustrated in FIGS. 4a to 4c in which the frontal surface of a cassette mounted on supporting body 1 projects beyond frontal face 1" of supporting body 1 and in such embodiments a portion of the side wall of the cassette presents another ledge, in additional to ledge 1''' shown in FIG. 4b, between frontal reversible circumference cutting plate 4 of cutting plate rows 2 and the frontal surface of the cassette. The amount of projection of reversible face cutting plates 8 beyond frontal reversible circumference cutting plates 4 of rows 2 can be divided in a suitable manner between ledge 1''' of supporting body 1 and the cassette, without the cassette projecting too far beyond frontal face 1".

The advantage connected with the use of cassettes and recesses having quadrilateral cross sections is, in particular, that the cassettes can be immobilized without difficulty in the associated recesses of the supporting body and thus provide good support to the highly stressed reversible face cutting plates. Moreover, the cassettes, which are easy to manufacture because of their cross-sectional configuration, can easily be exchanged for differently equipped cassettes and/or cassettes having different dimensions.

It will be understood that the above description of the present invention is susceptible to various modifications, changes and adaptations and the same are intended to be comprehended within the meaning and range of equivalents of the appended claims.

In a preferred embodiment of the invention (see FIG. 1b for example), the at least one cassette totally fills the cross-section of the associated recess, i.e. the cross-section of the cassette corresponds to that of the recess (in opposition to the embodiment shown in FIG. 3).

The fastening of the cassettes to the supporting body—preferably by at least one fastening element penetrating the associated cassette—has the result, that each cassette is provided with a corresponding number of bores, i.e. with at least one bore. This is shown in FIGS. 1b and 1c, for example: The clamping screws 12 penetrate the cassettes 12, provided with a throughgoing bore 12!

What is claimed is:

1. A frontal face milling cutter comprising:

a supporting body having a longitudinal axis, a longitudinal direction parallel thereto, a frontal face and a circumferential side, said supporting body being provided with a radial recess which extends continuously across a diameter of said frontal face, has a rectangular cross section and is open toward said frontal face, said supporting body further being provided with a bore centered in said supporting body and opening at said frontal face, said bore defining a cylindrical abutment surface in said supporting body;

a plurality of cutting plates disposed on said circumferential side and arranged in rows each extending generally in said longitudinal direction, two of said cutting plates being frontal face cutting plates each having a cutting edge for cutting at both said circumferential side and at said frontal face;

a single frontal face cassette having a cross section corresponding to the rectangular cross section of said recess and being insertable into said recess from the direction of said frontal face, said cassette having a centering ledge for insertion into said bore and for cooperating with said cylindrical abutment surface to secure the position of said cassette in the radial direction of said supporting body, said two frontal face cutting plates having means to fasten said frontal face cutting plates to said cassette and being arranged diametrically opposite one another with respect to the longitudinal axis; and a fastening element for releasably tightening said cassette in said recess in the direction of said supporting body, said fastening element passing through said cassette and engaging said supporting body from the direction of the frontal face of said supporting body.

* * * * *